(12) United States Patent
Slusarczyk

(10) Patent No.: US 10,239,376 B2
(45) Date of Patent: Mar. 26, 2019

(54) HYDRAULIC DAMPER WITH AN X-FLOW PISTON ASSEMBLY

(71) Applicant: BeijingWest Industries Co., Ltd., Beijing (CN)

(72) Inventor: Pawel Slusarczyk, Cracow (PL)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 0 days.

(21) Appl. No.: 15/681,287

(22) Filed: Aug. 18, 2017

(65) Prior Publication Data

US 2018/0079270 A1    Mar. 22, 2018

Related U.S. Application Data

(60) Provisional application No. 62/398,038, filed on Sep. 22, 2016.

(51) Int. Cl.
*F16F 9/34* (2006.01)
*B60G 13/08* (2006.01)
(Continued)

(52) U.S. Cl.
CPC ............... *B60G 13/08* (2013.01); *F16F 9/18* (2013.01); *F16F 9/3214* (2013.01); *F16F 9/348* (2013.01);
(Continued)

(58) Field of Classification Search
CPC .... F16F 9/16; F16F 9/18; F16F 9/3214; F16F 9/34; F16F 9/3405; F16F 9/344; F16F 9/348; F16F 9/3481; F16F 9/3482
(Continued)

(56) References Cited

U.S. PATENT DOCUMENTS

| 374,080 A | 11/1887 | Nickerson |
| 4,615,420 A * | 10/1986 | Mourray ............... F16F 9/348 |
| | | 137/493.9 |

(Continued)

FOREIGN PATENT DOCUMENTS

| CN | 101008429 | 8/2007 |
| CN | 104246285 | 12/2014 |

(Continued)

OTHER PUBLICATIONS

English-language abstract of JP 03-069836 (no date).*

(Continued)

*Primary Examiner* — Nicholas J Lane
(74) *Attorney, Agent, or Firm* — William H. Honaker; Dickinson Wright PLLC

(57) ABSTRACT

A hydraulic damper including a piston assembly having a piston body including at least two first channels and at least two second channels. The first and second channels are sloped. A compression side of each of the first channels is positioned radially outward relative to a rebound side. A rebound side of each of the second channels is positioned radially outward relative to a compression side. At least one main disc at least partially covers the rebound side of each of the first channels, and at least one main disc at least partially covers the compression side of each of the second channels. At least one supplementary channel is positioned radially inward with respect to the first and second channels. At least one supplementary disc at least partially covers at least one of a rebound side and a compression side of the at least one supplementary channel.

20 Claims, 6 Drawing Sheets

(51) Int. Cl.
*F16F 9/18* (2006.01)
*F16F 9/32* (2006.01)
*F16F 9/348* (2006.01)
*B60G 17/08* (2006.01)
*F16F 9/512* (2006.01)

(52) U.S. Cl.
CPC ............ *F16F 9/3481* (2013.01); *B60G 17/08* (2013.01); *B60G 2202/24* (2013.01); *B60G 2206/41* (2013.01); *B60G 2500/11* (2013.01); *B60G 2800/162* (2013.01); *F16F 9/185* (2013.01); *F16F 9/5126* (2013.01); *F16F 2228/066* (2013.01)

(58) Field of Classification Search
USPC .......................... 188/322.13, 322.15, 322.22
See application file for complete search history.

(56) References Cited

U.S. PATENT DOCUMENTS

| | | | |
|---|---|---|---|
| 4,974,707 A | 12/1990 | Neumann et al. | |
| 5,072,812 A * | 12/1991 | Imaizumi | F16F 9/3405 137/493.9 |
| 5,148,897 A | 9/1992 | Vanroye | |
| 5,259,294 A | 11/1993 | May | |
| 5,460,663 A | 10/1995 | Hashimoto et al. | |
| 6,397,987 B1 * | 6/2002 | Pesch | F16F 9/3214 188/322.15 |
| 8,955,654 B2 * | 2/2015 | Nygren | F16F 9/3485 188/282.5 |
| 2001/0009214 A1 | 7/2001 | Tanaka | |
| 2005/0056505 A1 | 3/2005 | Deferme | |
| 2006/0283676 A1 | 12/2006 | Deferme | |
| 2008/0185246 A1 | 8/2008 | Park | |
| 2008/0314704 A1 | 12/2008 | Deferme | |
| 2009/0000891 A1 | 1/2009 | Kouyama et al. | |
| 2010/0163355 A1 | 7/2010 | Vamaguchi | |
| 2010/0294604 A1 | 11/2010 | Morita | |
| 2011/0017558 A1 | 1/2011 | Nygren et al. | |
| 2014/0076677 A1 | 3/2014 | Kobayashi et al. | |
| 2014/0262655 A1 * | 9/2014 | Tuts | F16F 9/348 188/322.15 |
| 2017/0058987 A1 * | 3/2017 | Nakano | F16F 9/34 |

FOREIGN PATENT DOCUMENTS

| | | |
|---|---|---|
| DE | 10245404 | 4/2004 |
| DE | 102009026591 | 12/2009 |
| JP | 03069836 A * | 3/1991 |
| JP | 2000055103 | 2/2000 |
| JP | 2001214951 | 8/2001 |
| JP | 2007120726 | 5/2007 |
| KR | 20020040243 | 5/2002 |
| WO | 2014156445 | 10/2014 |

OTHER PUBLICATIONS

European Search Report dated Feb. 26, 2018 (12 pages).
First Office Action and search report dated Jan. 4, 2019 for counterpart Chinese patent application No. 201710754819.0, along with machine EN translation downloaded from EPO.

* cited by examiner

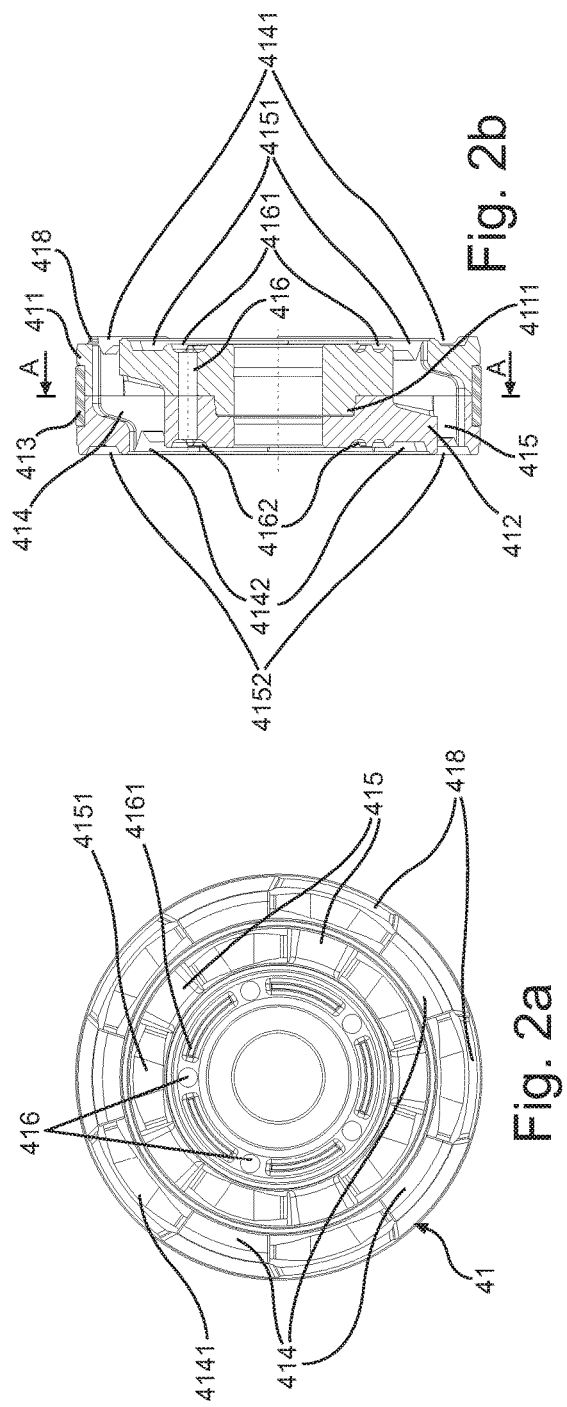

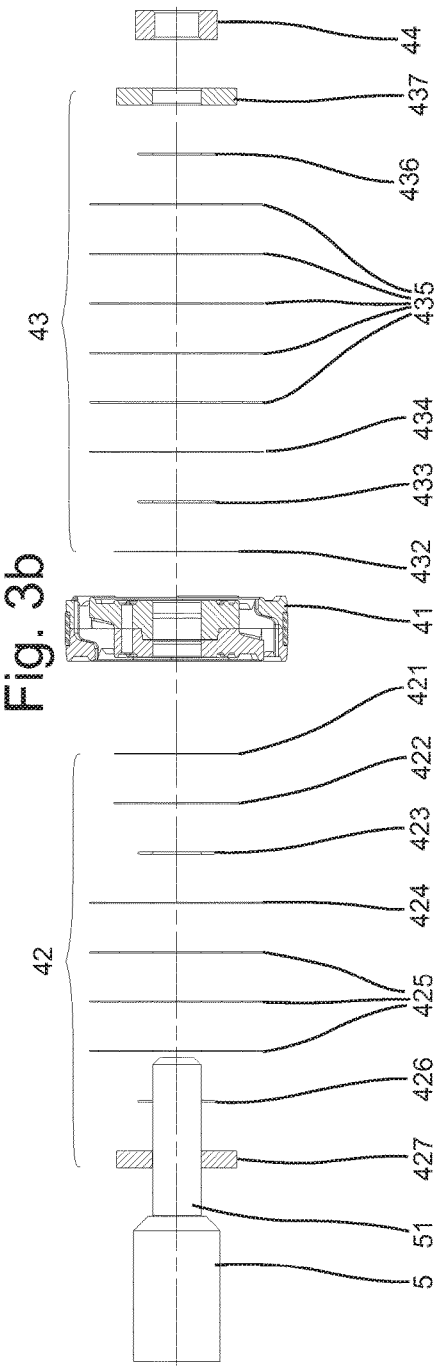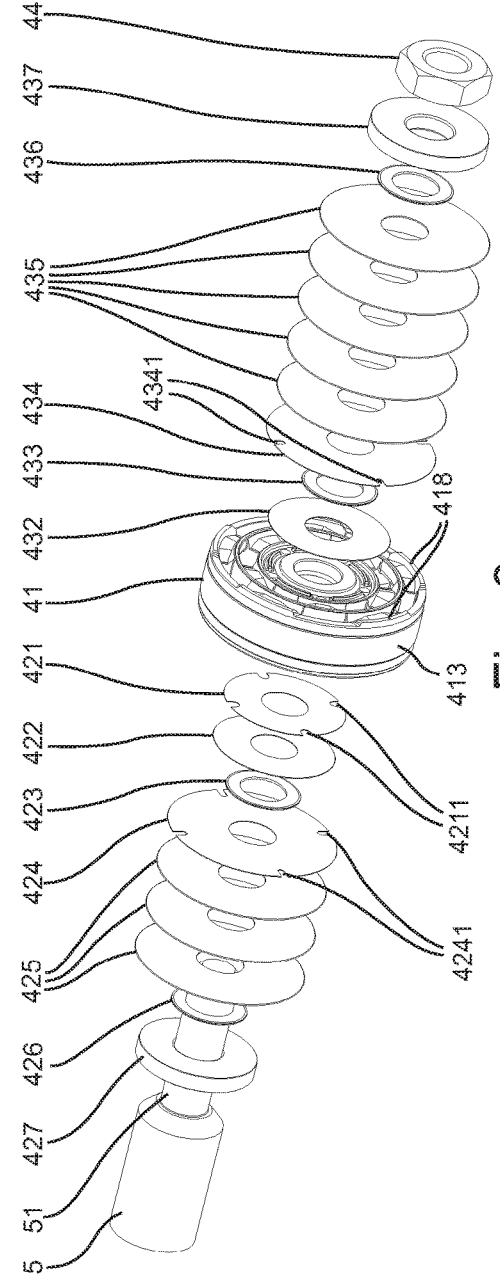

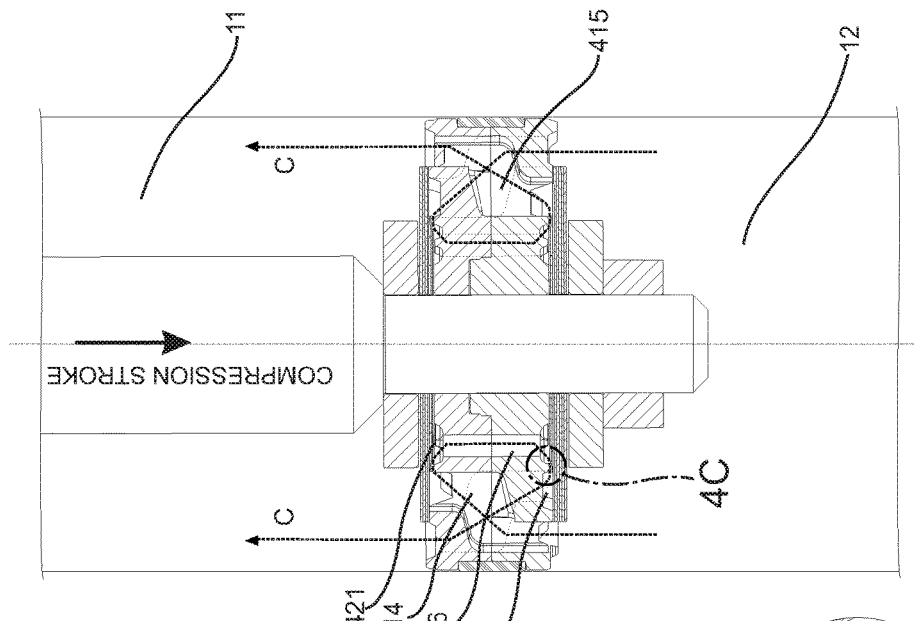
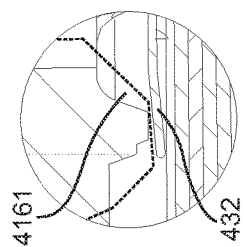
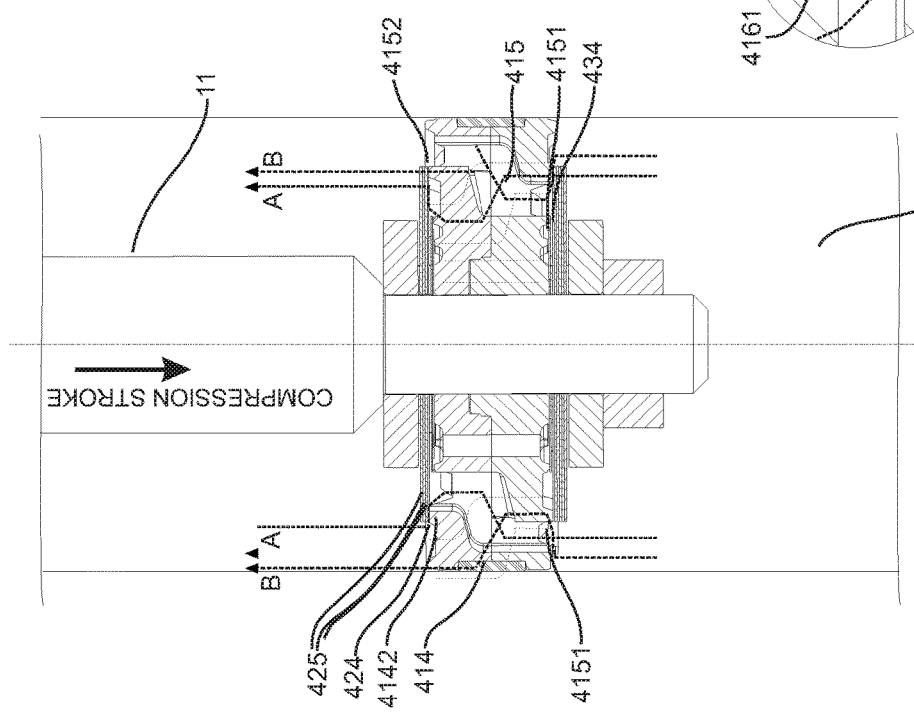

HYDRAULIC DAMPER WITH AN X-FLOW PISTON ASSEMBLY

CROSS REFERENCE TO RELATED APPLICATION

This application claims the benefit of U.S. Provisional Patent Application Ser. No. 62/398,038 filed on Sep. 22, 2016, and titled "Hydraulic Damper With an X-Flow Piston Assembly", the entire disclosure of which is hereby incorporated by reference.

TECHNICAL FIELD

The invention relates to a hydraulic damper, in particular a motor vehicle hydraulic suspension damper.

BACKGROUND OF THE INVENTION

A piston assembly is a key component of a hydraulic damper, and its construction and configuration has a major influence on a damper force vs. piston velocity characteristic during compression and rebound strokes of the damper. It is therefore desirable to enable for shaping and tuning of this force-velocity relation for each piston velocity range (low speed, medium speed, high speed) independently for each range and independently for the compression stroke and for the rebound stroke, in order to improve safety and vehicle handling properties, reduce unwanted vibrations, improve passengers comfort, etc.

U.S. patent application publication no. US 2010/163355, Japanese patent application publication no. JP 2000055103 and international patent application publication no. WO 2014/156445 all disclose piston assemblies provided with various kinds of X-flow (also called cross-flow) arrangements through a piston body, where the piston body is provided with a number of first channels sloped with respect to the damper axis and a number of second channels sloped with respect to the damper axis, so that a compression side of the first channels is radially outward with respect a rebound side thereof and a rebound side of the second channels is radially outward with respect to a compression side thereof. At least one disc covers the rebound side of the first channels and at least one disc covers the compression side of the second channels.

Furthermore, U.S. Pat. No. 5,148,897 discloses a pressure-operated valving arrangement for a shock absorber piston assembly provided with bi-directional primary and secondary flow paths for regulating the damping forces generated during both rebound and compression strokes. During a rebound stroke, a pressure differential is generated across a moveable valve disc which operates to regulate fluid flow from an upper portion to a lower portion of the shock absorber's working chamber. A pilot orifice in the valve disc and a bleed slot associated with a rebound blow-off assembly are sized to generate the desired pressure differential across the valve disc. Manipulation of the size ratio permits universality of design, providing economic manufacturing of the shock absorber.

U.S. patent application publication no. US 2010/294604 discloses a damping mechanism having a piston body provided with channels allowing for an "N-shaped" flow of working liquid through the piston and check valves that may open after the piston rod reaches a predetermined velocity threshold, thus enabling a flow of working liquid directly through the piston.

SUMMARY OF THE INVENTION

According to an aspect of the disclosure, it is an object of the present invention to provide a hydraulic damper of simple construction, which would be cost efficient, simple to manufacture, and would provide an excellent damper tuning capabilities independently for the compression and the rebound stroke and in all the ranges of the piston velocity.

Thus according to an aspect of the disclosure, a hydraulic damper is provided. The hydraulic damper includes a tube that extends along an axis and is filled with a working liquid. A piston assembly is slidably disposed inside the tube and divides the tube into a rebound chamber and a compression chamber. The piston assembly is attached to a piston rod that extends outside of the tube. The piston assembly includes a piston body including at least two first channels sloped with respect to the axis and extending between a compression side and a rebound side, and at least two second channels sloped with respect to the axis and extending between a rebound side and a compression side. The compression side of each of the first channels is positioned radially outward relative to the rebound side of each of the first channels. Furthermore, the rebound side of each of the second channels is positioned radially outward relative to the compression side of each of the second channels, thus forming a cross-flow arrangement through the piston body. At least one main disc at least partially covers the rebound side of each of the first channels, and at least one main disc at least partially covers the compression side of each of the second channels. The piston body further defines at least one supplementary channel provided with a compression side and a rebound side. The supplementary channel is positioned radially inward with respect to the first sloped channels and the second sloped channels. At least one supplementary disc at least partially covers at least one of the rebound side and the compression side of the at least one supplementary channel. The at least one supplementary channel is configured to be fluidly connected with the rebound chamber and the compression chamber during compression and/or rebound strokes of the damper.

According to another aspect of the disclosure, at least one of the rebound side of the first channels, the compression side of the second channels, the compression side of the supplementary channels, and the rebound side of the supplementary channels is shaped as an annular recessed seat, thus enabling fluid communication with the respective entries of the channels.

According to another aspect of the disclosure, at least one of the at least one main rebound side disc, the at least one main compression side disc, the at least one supplementary rebound side disc, and the at least one supplementary compression side disc is provided with at least one notch at an outer edge thereof.

According to another aspect of the disclosure, the at least one notch of the at least one main rebound side disc, the at least one main compression side disc, the at least one supplementary rebound side disc, or the compression side disc is axially covered by another of the discs.

According to another aspect of the disclosure, at least one of the at least one main rebound side disc, the at least one main compression side disc, the at least one supplementary rebound side disc, and the at least one supplementary compression side disc is deflective and axially fixed at an inner edge thereof.

According to another aspect of the disclosure, at least one of the at least one main rebound side disc, the at least one main compression side disc, the at least one supplementary rebound side disc, and the at least one supplementary compression side disc is axially displaceable and preloaded with at least one spring.

According to another aspect of the disclosure, at least one of the at least one rebound side supplementary disc and the at least one compression side supplementary disc is configured to provide flow of working liquid through the supplementary channels respectively after reaching a predefined supplementary rebound velocity threshold and/or a predefined supplementary compression velocity threshold.

According to another aspect of the disclosure, the piston body includes a compression side member and a rebound side member stacked together. One of the compression side and rebound side members includes an axial protrusion extending axially therefrom. The other of the compression side and rebound side members is provided with an axial recess extending axially therein and matching the shape of the axial protrusion and forming a lock preventing mutual rotation of the compression member with respect to the rebound member after the piston body is stacked together.

BRIEF DESCRIPTION OF THE DRAWINGS

The invention shall be described and explained below in connection with the attached drawings on which:

FIG. 2a is a front view of a piston body of a piston assembly of the twin-tube damper of FIG. 1;

FIG. 2b is a side cross-sectional view of the piston body of the piston assembly of the twin-tube damper of FIG. 1;

FIG. 2c is a front cross-sectional view of the piston body of the piston assembly of the twin-tube damper of FIG. 1 taken from plane A-A shown in FIG. 2b;

FIG. 2d is a perspective view of the piston body of the piston assembly of the twin-tube damper of FIG. 1;

FIG. 3a is an exploded perspective view of the piston assembly of the twin-tube damper of FIG. 1;

FIG. 3b is an exploded side cross-sectional view of the piston assembly of the twin-tube damper of FIG. 1;

FIG. 4a is a side cross-sectional view of the piston assembly of the twin-tube damper of FIG. 1 during a damper compression stroke in a low velocity range;

FIG. 4b is a side cross-sectional view of the piston assembly of the twin-tube damper of FIG. 1 during the damper compression stroke in a medium velocity range;

FIG. 4c is a magnified view of a compression side annular seat and first supplementary disc of the piston assembly of FIG. 4b;

DESCRIPTION OF THE ENABLING EMBODIMENT

Figure 1:
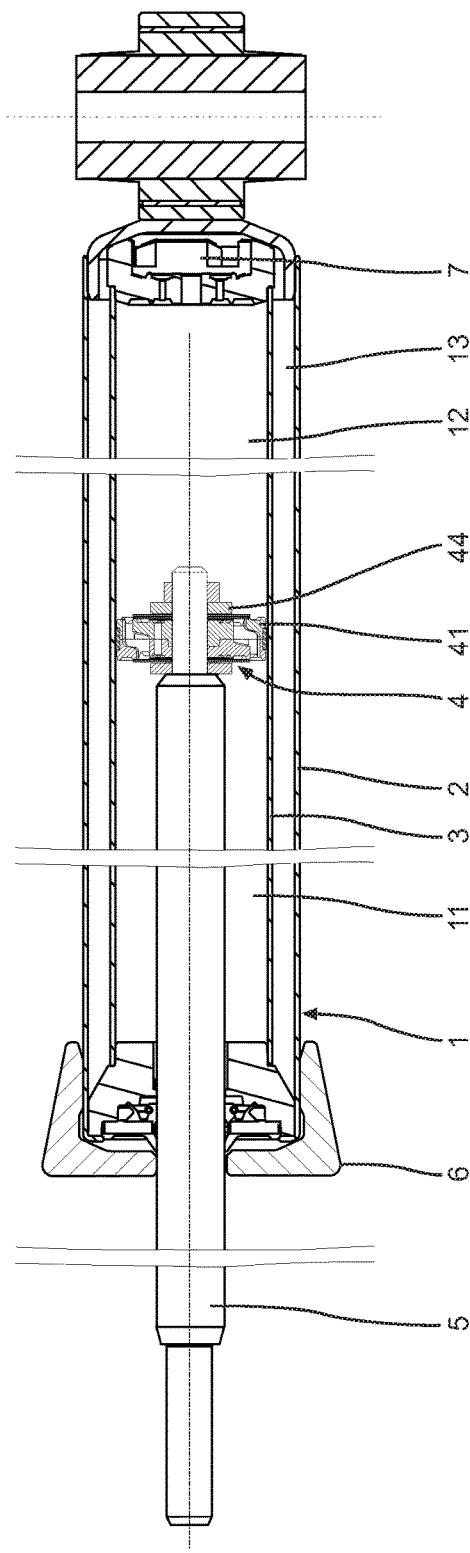
FIG. 1 is a schematic side cross-sectional view of a twin-tube damper according to the present invention.

FIG. 1 presents an embodiment of a twin-tube damper 1 according to the present invention that may be employed in a typical motor vehicle suspension. The damper 1 comprises an external tube 2 and a main tube 3 filled with viscous working liquid inside of which a movable piston assembly 4 attached to a piston rod 5 led outside the damper 1 through a sealed piston rod guide 6 is disposed. The damper 1 is also provided with a base valve assembly 7 fixed at the other end of the main tube 3. The piston assembly 4 makes a sliding fit with the inner surface of the main tube 3 and divides the tube 3 into a rebound chamber 11 (between the piston rod guide 6 and the piston assembly 4) and a compression chamber 12 (between the piston assembly 4 and the base valve assembly 7). An additional compensation chamber 13 is located at the other side of the base valve assembly 7.

The term "compression" as used herein with reference to particular elements of the damper refers to these elements or parts of elements which are adjacent to the compression chamber 12 or, in a case of working liquid flow direction, it refers to this flow direction that takes place during the compression stroke of the damper. Similarly the term "rebound" as used in this specification with reference to particular elements of the damper refers to these elements or these parts of particular elements which are adjacent to the rebound chamber 11 or, in a case of working liquid flow direction, it refers to this flow direction that takes place during the rebound stroke of the damper.

The piston assembly 4 is provided with valve assemblies to control the flow of working liquid passing between the rebound chamber 11 and the compression chamber 12 while the piston assembly 4 is in motion. Also the base valve assembly 7 is provided with valve assemblies to control the flow of working liquid passing between the compression chamber 12 and the compensation chamber 13 while the piston assembly 4 is in motion. Nonetheless, as shall be recognised by those skilled in the art from the following description, the invention is also applicable to other damper constructions, including mono-tube dampers provided with a gas compensation chamber separated with a slidable diaphragm from the compression chamber 12.

As shown in FIGS. 2a-2d, the piston assembly 4 comprises a shaped piston body 41 which in this embodiment is composed of a compression member 411 and a rebound member 412 stacked together and surrounded by an annular Teflon sealing 413. The compression member 411 of the piston body 41 is provided with a shaped axial protrusion 4111 and the rebound member 412 of the piston body 41 is provided with a corresponding shaped axial recess 4121. The shape of the protrusion 4111 matches the shape of the recess 4121, thus forming a kind of a lock preventing mutual rotation of the compression member 411 with respect to the rebound member 412 after the piston body 41 is stacked and assembled together (cf. FIG. 2b). The compression member 411 is also provided at its external rim with a set of equiangularly spaced marking protrusions 418 that visually and tactilely mark the compression side of the piston body 41 enabling for its correct positioning during assembly of the damper.

The piston body 41 is provided with a first set of five equiangularly spaced sloped channels 414 separated by ten bridges 417 (cf. FIG. 2c) with a second set of five equiangularly spaced sloped channels 415 enabling for a flow of working liquid while the piston assembly 4 is in motion. At the rebound side 4142 of the first sloped channels 414 their entries are connected with each other forming an annular recessed seat enabling for a fluid communication of these entries of the channels 414 with each other at the rebound side of the piston body 41.

Similarly, at the compression side 4151 of the second sloped channels 415 their entries are connected with each other forming an annular recessed seat joining them at the compression side of the piston body 41.

Channels 414 and 415 are sloped with respect to the damper axis, so that the outer compression side 4141 of the channels 414 is radially outer with respect to the inner rebound side annular seat 4142. Likewise the outer rebound side 4152 of the channels 415 is radially outer with respect to the inner compression side annular seat 4151.

The piston body 41 is further provided with five equiangularly spaced supplementary axial channels 416 which are radially inner both with respect to the first and the second sloped channels 414 and 415. Both compression and rebound sides 4161, 4162 of the supplementary channels 416 also have forms of annular recessed seats enabling for a fluid communication of the respective entries of the channels 416.

Functionality of the channels 414, 415 and 416 shall be described later in particular with reference to FIGS. 4a-4d and FIG. 5.

As shown in FIGS. 3a-3b, at the rebound side of the piston body 41, the piston assembly 4 is provided with a rebound side valve assembly 42 formed by a stack of discs comprising two supplementary deflective discs 421, 422 of a similar diameter, a retaining disc 423, four main deflective discs 424, 425 of a similar diameter, a clamp disc 426, and a retainer 427 distancing the rebound side assembly 42 from the piston rod 5.

The first supplementary disc 421 covers or engages the rebound side annular seat 4162 of the supplementary channels 416 and is covered at the rebound side by the supplementary disc 422 that additionally stiffens the engaging disc 421. The engaging supplementary disc 421 is further provided with four equiangularly formed radial recesses or notches 4211 on the outer edge thereof so that a limited flow of working liquid is still possible through the channels 416 and the radial notches 4211 even in a flat, undeflected position of the supplementary discs 421 and 422. The inner edges of the supplementary discs 421 and 422 are axially pressed to the piston body 41 by the retaining disc 423 of a smaller diameter that enables their deflection to the rebound side of the piston body 41 after a certain supplementary rebound velocity threshold is reached in order to enable for a more unrestricted flow of working liquid.

The first main disc 424 abuts the retaining disc 423 and covers or engages the inner rebound side annular seat 4142 of the first sloped channels 414. The disc 424 is covered at the rebound side by the stack of three main discs 425 that additionally stiffens the engaging disc 424. The engaging main disc 424 is also provided with four equiangularly formed radial recesses or notches 4241 on the outer edge thereof so that a limited flow of working liquid is still possible through the channels 414 and the radial notches 4241 even in a flat, undeflected position of the main discs 424 and 425. The main discs 424 and 425 may also deflect to the rebound side of the piston body 41 after a certain main compression velocity threshold is reached in order to enable for a more unrestricted flow of working liquid.

At the compression side of the piston body 41, the piston assembly is provided with a compression side valve assembly 43 having construction similar to the rebound side valve assembly 42 and formed by a stack of discs comprising a supplementary deflective disc 432, a retaining disc 433, six main deflective discs 434, 435 of a similar diameter, a clamp disc 436, and a retainer 437.

The first supplementary disc 432 covers or engages the compression side annular seat 4161 of the supplementary channels 416 and is axially pressed to the piston body 41 by the retaining disc 433 of a smaller diameter that enables the engaging disc 432 to deflect to the compression side of the piston body 41 after a certain supplementary compression velocity threshold is reached in order to enable for a flow of working liquid.

The first main disc 434 abuts the retaining disc 433 and covers or engages the inner compression side annular seat 4151 of the second sloped channels 415. The disc 434 is covered at the compression side by the stack of five main discs 435 that additionally stiffen engaging disc 434. The engaging main disc 434 is also provided with four equiangularly formed radial recesses or notches 4341 on the outer edge thereof so that a limited flow of working liquid is still possible through the channels 415 and the radial notches 4341 even in a flat, undeflected position of the main discs 434 and 435. The main discs 434 and 435 may also deflect to the compression side of the piston body 41 after a certain main rebound velocity threshold is reached in order to enable for a more unrestricted flow of working liquid.

All the components of the piston assembly 4 are fixed on an axial protrusion 51 of the piston rod 5 by means of a nut 44 screwed on an internal thread of the protrusion 51 so that the inner edges of all the discs 421, 422, 424, 425, 432, 434 and 435 are axially fixed which enables for their deflection.

FIGS. 4a-4d illustrates the functionality of the piston assembly during a compression stroke.

FIG. 4a illustrates a situation that takes place when the velocity of the piston rod 5 is low. As shown, working liquid flows from the compression chamber 12 to the rebound chamber 11 via pathways A and B. Flowing through the pathway A, working liquid enters the first sloped channels 414 through their open entries and flows out through the inner rebound side annular seat 4142 and the notches 4241 of the main deflective notched disc 424. In this velocity range, its pressure remains below the main compression velocity threshold and is insufficient to deflect the main discs 424 and 425. Through the pathway B, working liquid flows through the notches 4341 of the main deflective notched disc 434 to the inner compression side annular seat 4151 and through the second sloped channels 415 flows out at their outer rebound side 4152.

Furthermore, working liquid flows through the notches 4211 of the supplementary deflective notched disc 421 and fills the supplementary channels 416, but in this velocity range its pressure remains below the supplementary compression velocity threshold and is insufficient to deflect the supplementary deflective disc 432.

If the piston rod 5 velocity is higher, the pressure of working liquid in the channels 416 exceeds the supplementary compression velocity threshold and the disc 432 deflects, joining the compression side annular seat 4161 of the supplementary channels 416 with the inner compression side annular seat 4151 of the second sloped channels 415, as shown in FIG. 4b. This creates an additional loop-flow pathway C, distinctive to the present invention, through the supplementary channels 416 in direction corresponding to the piston stroke and further through the second sloped channels 415. Obviously, pathways A and B shown in FIG. 4a are also available but for the clarity of the drawing, they are not depicted in FIG. 4b.

Figure 4D:
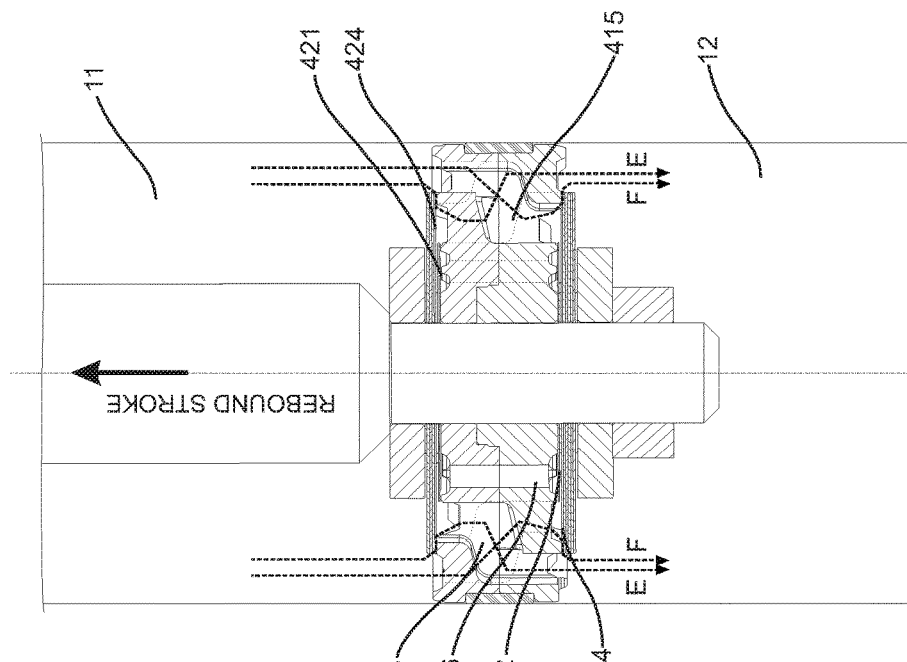
FIG. 4d is a side cross-sectional view of the piston assembly of the twin-tube damper of FIG. 1 during the damper compression stroke in a high velocity range.

Finally, if the piston rod 5 velocity is even higher, the pressure of working liquid in the first sloped channels 414 reaches the main compression velocity threshold, and the main deflective notched disc 424 along with the stack of discs 425 deflect, joining the inner rebound side annular seat 4142 of the channels 414 with the outer rebound side 4152 of the channels 415 and creating yet additional flow pathway D directly through the channels 414 as shown in FIG. 4*d*. Obviously pathways A and B shown in FIG. 4*a*, as well as loop-flow pathway C shown in FIG. 4*b* are also available, but for the clarity of the drawing they were not depicted in FIG. 4*d*.

Figure 5:
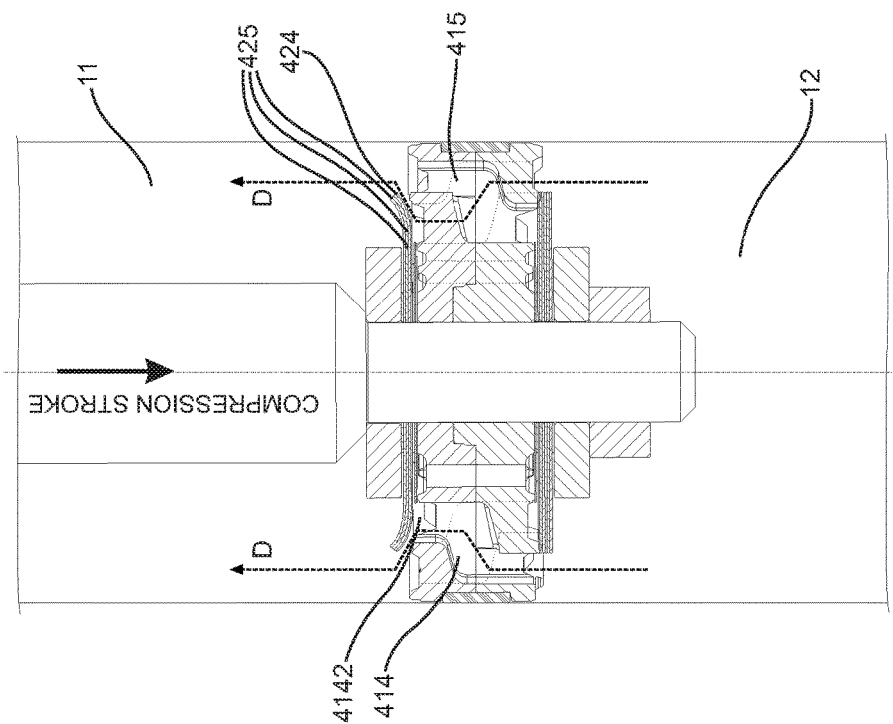
FIG. 5 is a side cross-sectional view of the piston assembly of the twin-tube damper of FIG. 1 during the damper rebound stroke.

Similar flow pathways and thresholds are also present during the rebound stroke of the damper as schematically shown in FIG. 5. Without unnecessary elaboration, it is visible that the liquid may flow from the rebound chamber 11 to the compression chamber 12 through the notches 4241 of the main deflective notched disc 424 and through to the first sloped channels 414, as depicted by pathway E or through the second sloped channels 415 and through the notches 4341 of the main deflective notched disc 434 as depicted by pathway F and if the piston velocity is higher than the main rebound velocity threshold, the discs 434 and 435 will obviously deflect providing higher flow area. Some embodiments of the invention might also enable for a flow of working liquid through the notches 4211 of the engaging supplementary disc 421 and supplementary channels 416, in order to eventually deflect the disc 432. Nonetheless, this would require for a provision of certain restrictions in the first sloped channels 414.

In the embodiment described above, the rebound side 42 and the compression side 43 valve assemblies are not symmetrical: there are four main discs 424, 425 and two supplementary disc 421, 422 on the rebound side 42 as compared to six main discs 434, 435 and one supplementary disc 432 on the compression side 43, and no notched supplementary disc is present on the compression side 43. This obviously provide different damping characteristics depending on the stroke. Nonetheless, the construction and shaping of the piston body 41 is highly symmetrical and the discs on both sides are unified that is the disc 424 is the same as the disc 434, etc. Such a unification of components, due to the symmetry of the piston assembly 4 simplifies its assembly and is highly economical.

As shall be apparent for a skilled technician various configurations of the piston assembly according to the present invention are possible as required and the only prerequisite is to enable for a fluid communication of the supplementary channels 416 with the rebound chamber 11 and the compression chamber 12 at least for a certain velocity range during compression and/or rebound stroke of the damper 1. Such a fluid communication may in turn enable for an initial inflow of working liquid into the supplementary channels 416 in order to apply a pressure on a disc at the other side of the channels 416. In other words, the channels 416 must not be entirely and permanently covered at both sides that is both at their compression side annular seat 4161 and at the rebound side annular seat 4162 as this would entirely disable a flow of working liquid through the channels 416. To this end, it is possible to employ engaging supplementary discs with notches or other similar internal through openings (as the disc 421 with the notches 4211 described above in the context of the exemplary preferred embodiment), employ a supplementary disc only at one side of the channels, etc.

Figure 6:
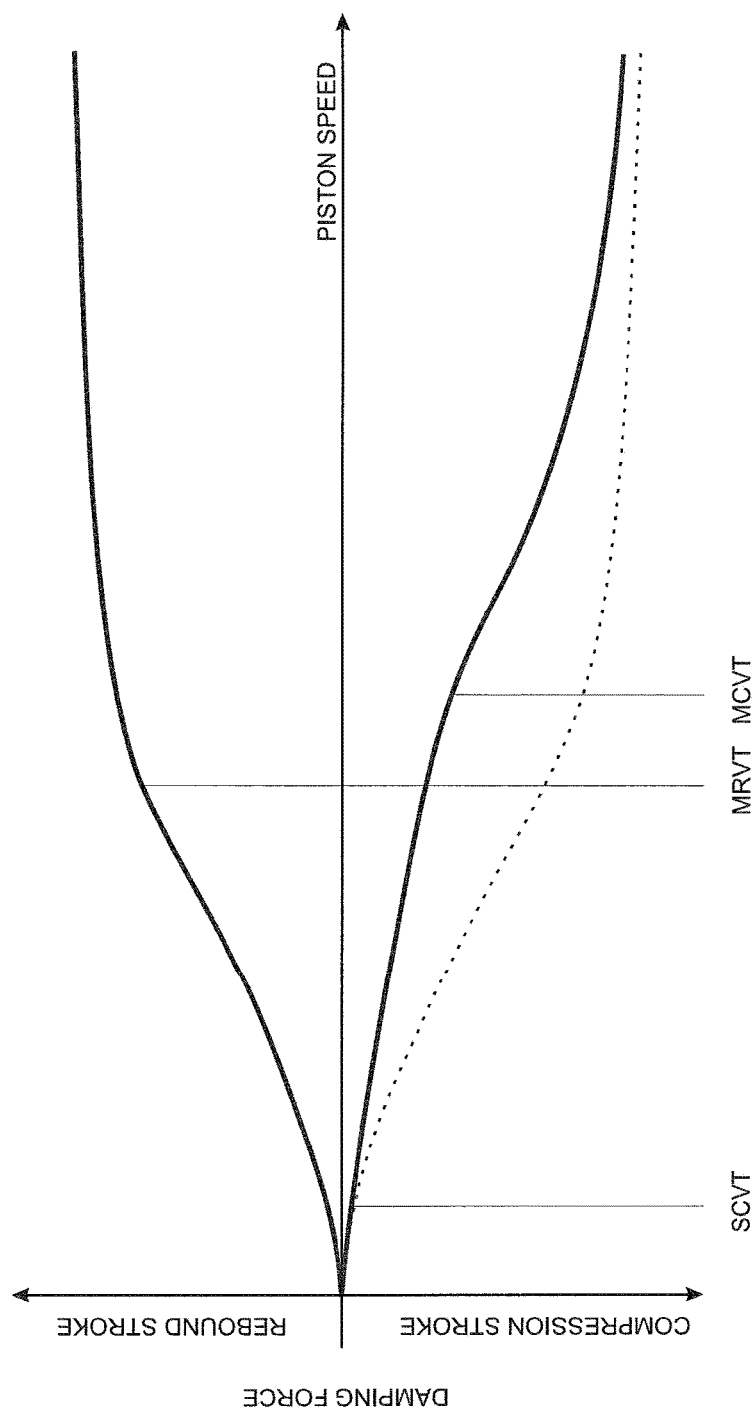
FIG. 6 is a diagram illustrating damping force characteristics of the twin-tube damper shown in FIG. 1 with an x-axis corresponding with piston speed and a y-axis corresponding with damping force.

FIG. 6 shows a damping force characteristics of the damper shown in FIGS. 1-5 and described above during compression and rebound strokes (solid line) and, as an illustration, a characteristic of the damper devoid of the notched supplementary disc 421, that is a situation in which a fluid communication of the supplementary channels 416 with the rebound chamber 11 and the compression chamber 12 is suppressed, during compression stroke (dashed line).

As shown, during a compression stroke, when the piston velocity remains below the supplementary compression velocity threshold (SVCT), the damping force is generated solely by the frictional resistance of the notches 4241. After reaching the SVCT threshold, the engaging supplementary disc 432 of the compression side valve assembly 43 deflects enabling for a smoother increase of the damping force. Finally, the main compression velocity threshold (MVCT) triggers deflection of the main discs 424 and 454.

As shown in FIGS. 4*a*-4*d* and FIG. 5 it shall also be obvious for a skilled technician that the number, thickness and/or material of the deflective discs 424 and 425 or the discs 434 and 435, the number and the area of the optional notches 4211, 4241, the number and the cross-flow area of the channels 414, 415 and 416 provide excellent capabilities for setting various pressure thresholds and flow restrictions to be generated for working liquid passing between the rebound chamber 11 and the compression chamber 12 along the various flow pathways within the piston body 41, while the piston assembly 4 is in motion. This in turn provides virtually unlimited capabilities for shaping and tuning a preferable damping force characteristics of the damper independently for the compression and the rebound stroke and for various ranges of the piston velocity.

Furthermore, a skilled technician will understand that although all the discs 421, 422, 424, 425, 432, 434 and 435 disclosed in the preferred embodiment described above are deflective (i.e. their inner edges are axially fixed) it may appear advantageous to employ all or some discs featuring other functionality such as stiff axially displaceable or floating discs or discs biased with spring or springs.

The above embodiments of the present invention are therefore merely exemplary. The figures are not necessarily to scale, and some features may be exaggerated or minimized. These and other factors however should not be considered as limiting the spirit of the invention, the intended scope of protection of which is indicated in appended claims.

What is claimed is:

1. A hydraulic damper comprising:
   a tube extending along an axis and filled with working liquid;
   a piston assembly disposed slidably inside said tube and dividing said tube into a rebound chamber and a compression chamber, and attached to a piston rod extending outside of said tube;
   said piston assembly including:
   a piston body including at least two first channels sloped with respect to said axis and extending between a compression side and a rebound side, and at least two second channels sloped with respect to said axis and extending between a rebound side and a compression side;
   said compression side of each of said first channels is positioned radially outward relative to said rebound side of each of said first channels, and said rebound side of each of said second channels is positioned radially outward relative to said compression side of each of said second channels, thus forming a cross-flow arrangement through said piston body;
   at least one main rebound side disc at least partially covering said rebound side of each of said first channels, and at least one main compression side disc at least partially covering said compression side of each of said second channels;
   said piston body further defining a plurality of supplementary channels each provided with a compression side and a rebound side, said supplementary channels being positioned radially inward with respect to said first channels and said second channels; and at least one supplementary rebound side disc at least partially covering said rebound side of said supplementary channels, at least one supplementary compression side disc covering said compression side of said supplementary channels, and wherein said supplementary channels are each configured to be fluidly connected with said rebound chamber and said compression chamber during compression and/or rebound strokes of said damper;

wherein said compression side of said piston body defines at least one compression side annular recessed seat extending axially into said piston body toward said rebound side of said piston body and enabling fluid communication between entries of said supplementary channels, and wherein said at least one supplementary compression side disc covers said at least one compression side annular recessed seat;

wherein said compression side of said piston body further defines at least one inner compression side annular seat extending axially into said piston body toward said rebound side of said piston body and enabling fluid communication between entries of said second channels;

wherein said supplementary rebound side disc presents at least one passage fluidly connecting at least one of said first channels and at least one of said supplementary channels, and wherein during a compression stroke, when a piston rod velocity increases and a pressure of working liquid in said at least one supplementary channel exceeds a supplementary compression velocity threshold, said at least one supplementary compression side disc deflects, joining said at least one compression side annular recessed seat and said at least one inner compression side annular seat so as to create a loop-flow pathway through each of said supplementary channels in a direction corresponding to a piston stroke and further through said second channels.

2. The hydraulic damper according to claim 1, wherein at least one of said rebound side of said first channels, and said rebound side of said supplementary channels is shaped as an annular recessed seat enabling fluid communication of said respective entries of said channels.

3. The hydraulic damper according to claim 1, wherein said supplementary rebound side disc presents an outer edge, and where said at least one passage of said supplementarty rebound side disc is at least one notch extending radially inwardly from said outer edge of said supplementary rbeound side disc.

4. The hydraulic damper according to claim 3, wherein said at least one notch of said supplementary rebound side disc is axially covered by another of said discs.

5. The hydraulic damper according to claim 1, wherein at least one of said at least one main rebound side disc, said at least one main compression side disc, said at least one supplementary rebound side disc, and said at least one supplementary compression side disc is deflective and axially fixed at an inner edge thereof.

6. The hydraulic damper according to claim 1, wherein at least one of said at least one main rebound side disc, said at least one main compression side disc, said at least one supplementary rebound side disc, and said at least one supplementary compression side disc is axially displaceable and preloaded with at least one spring.

7. The hydraulic damper according to claim 1, wherein at least one of said at least one rebound side supplementary disc and said at least one compression side supplementary disc is configured to provide flow of working liquid through said supplementary channels respectively after reaching a predefined supplementary rebound velocity threshold and/or a predefined supplementary compression velocity threshold.

8. The hydraulic damper according to claim 1, wherein said piston body includes a compression side member and a rebound side member stacked together;

one of said compression side and rebound side members includes an axial protrusion extending axially therefrom; and said other of said compression side and rebound side members is provided with an axial recess extending axially therein and matching a shape of said axial protrusion and forming a lock preventing mutual rotation of said compression member with respect to said rebound member after said piston body is stacked together.

9. The hydraulic damper according to claim 2 wherein said at least one main rebound side disc and at least one of said at least one main compression side disc, and said at least one supplementary compression side disc are provided with at least one radial recess or notch at an outer edge thereof.

10. The hydraulic damper according to claim 2, wherein at least one of said at least one main rebound side disc, said at least one main compression side disc, said at least one supplementary rebound side disc, and said at least one supplementary compression side disc is deflective and axially fixed at an inner edge thereof.

11. The hydraulic damper according to claim 3, wherein at least one of said at least one main rebound side disc, said at least one main compression side disc, said at least one supplementary rebound side disc, and said at least one supplementary compression side disc is deflective and axially fixed at an inner edge thereof.

12. The hydraulic damper according to claim 4, wherein at least one of said at least one main rebound side disc, said at least one main compression side disc, said at least one supplementary rebound side disc, and said at least one supplementary compression side disc is deflective and axially fixed at an inner edge thereof.

13. The hydraulic damper according to claim 2, wherein at least one of said at least one main rebound side disc, said at least one main compression side disc, said at least one supplementary rebound side disc, and said at least one supplementary compression side disc is axially displaceable and preloaded with at least one spring.

14. The hydraulic damper according to claim 3, wherein at least one of said at least one main rebound side disc, said at least one main compression side disc, said at least one supplementary rebound side disc, and said at least one supplementary compression side disc is axially displaceable and preloaded with at least one spring.

15. The hydraulic damper according to claim 4, wherein at least one of said at least one main rebound side disc, said at least one main compression side disc, said at least one supplementary rebound side disc, and said at least one supplementary compression side disc is axially displaceable and preloaded with at least one spring.

16. The hydraulic damper according to claim 5, wherein at least one of said at least one main rebound side disc, said at least one main compression side disc, said at least one supplementary rebound side disc, and said at least one supplementary compression side disc is axially displaceable and preloaded with at least one spring.

17. The hydraulic damper according to claim 2, wherein at least one of said at least one rebound side supplementary disc and said at least one compression side supplementary disc is configured to provide flow of working liquid through said supplementary channels respectively after reaching a predefined supplementary rebound velocity threshold and/or a predefined supplementary compression velocity threshold.

18. The hydraulic damper according to claim 3, wherein at least one of said at least one rebound side supplementary disc and said at least one compression side supplementary disc is configured to provide flow of working liquid through said supplementary channels respectively after reaching a predefined supplementary rebound velocity threshold and/or a predefined supplementary compression velocity threshold.

19. The hydraulic damper according to claim 2, wherein said piston body includes a compression side member and a rebound side member stacked together;
one of said compression side and rebound side members includes an axial protrusion extending axially therefrom; and
said other of said compression side and rebound side members is provided with an axial recess extending axially therein and matching a shape of said axial protrusion and forming a lock preventing mutual rotation of said compression member with respect to said rebound member after said piston body is stacked together.

20. The hydraulic damper according to claim 3, wherein said piston body includes a compression side member and a rebound side member stacked together;
one of said compression side and rebound side members includes an axial protrusion extending axially therefrom; and
said other of said compression side and rebound side members is provided with an axial recess extending axially therein and matching a shape of said axial protrusion and forming a lock preventing mutual rotation of said compression member with respect to said rebound member after said piston body is stacked together.

* * * * *